(12) United States Patent
Taniguchi et al.

(10) Patent No.: US 6,700,634 B2
(45) Date of Patent: Mar. 2, 2004

(54) BACKLIT LIGHTING DEVICE, LIQUID CRYSTAL DISPLAY DEVICE UTILIZING SAME, AND LIQUID CRYSTAL DISPLAY DEVICE MANUFACTURING METHOD

(75) Inventors: Hitoshi Taniguchi, Yokohama (JP); Yasuo Hira, Yokohama (JP); Tetsuo Suzuki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 11 days.

(21) Appl. No.: 10/081,228

(22) Filed: Feb. 25, 2002

(65) Prior Publication Data

US 2003/0086030 A1 May 8, 2003

(30) Foreign Application Priority Data

Nov. 8, 2001 (JP) .................................. 2001-342850

(51) Int. Cl.[7] ................. G02F 1/1335; G01D 11/28; F21V 7/04
(52) U.S. Cl. ................. 349/65; 362/26; 362/31
(58) Field of Search ................. 349/61, 65; 362/31, 362/26

(56) References Cited

U.S. PATENT DOCUMENTS

| | | | | |
|---|---|---|---|---|
| 5,592,332 A | * | 1/1997 | Nishio et al. | 359/619 |
| 5,703,667 A | * | 12/1997 | Ochiai | 349/65 |
| 6,266,108 B1 | * | 7/2001 | Bao et al. | 349/63 |
| 6,328,453 B1 | * | 12/2001 | Ohkawa | 362/31 |
| 6,454,452 B1 | * | 9/2002 | Sasagawa et al. | 362/561 |
| 6,522,373 B1 | * | 2/2003 | Hira et al. | 349/65 |
| 2002/0036728 A1 | * | 3/2002 | Okumura | 349/61 |

FOREIGN PATENT DOCUMENTS

| | | |
|---|---|---|
| JP | 9-259623 | 10/1997 |
| JP | 9-269489 | 10/1997 |
| JP | 9-326205 | 12/1997 |
| JP | 10-153779 | 6/1998 |
| JP | 11-052370 | 2/1999 |
| JP | 11-126030 | 5/1999 |
| JP | 11-190844 | 7/1999 |
| JP | 11-249579 | 9/1999 |
| JP | 11-311778 | 11/1999 |
| JP | 2000-131690 | 5/2000 |
| JP | 2000-171641 | 6/2000 |
| JP | 2000-314882 | 11/2000 |
| JP | 2001-110224 | 4/2001 |
| JP | 2001155520 * | 6/2001 ............. F21V/8/00 |

* cited by examiner

Primary Examiner—Toan Ton
Assistant Examiner—Jeanne A. DiGrazio
(74) Attorney, Agent, or Firm—Antonelli, Terry, Stout & Kraus, LLP

(57) ABSTRACT

Light directional diffusing elements such as hologram elements are formed on the upper surface or lower surface of a light guide plate near the light source, and dots are formed of multiple small protrusions or small depressions on the light guide plate upper or lower surface to change the direction the light transmits from the input surface of the upper surface of light guide plate to a specified angle to irradiate towards a display element, to obtain a liquid crystal display technology for an easy to assemble backlit lighting device with greater brightness and fewer dark spots.

30 Claims, 15 Drawing Sheets

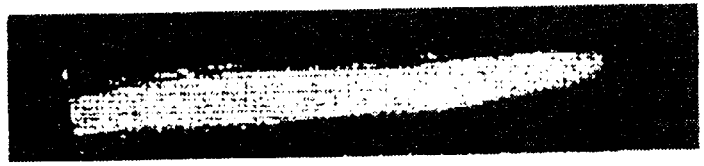
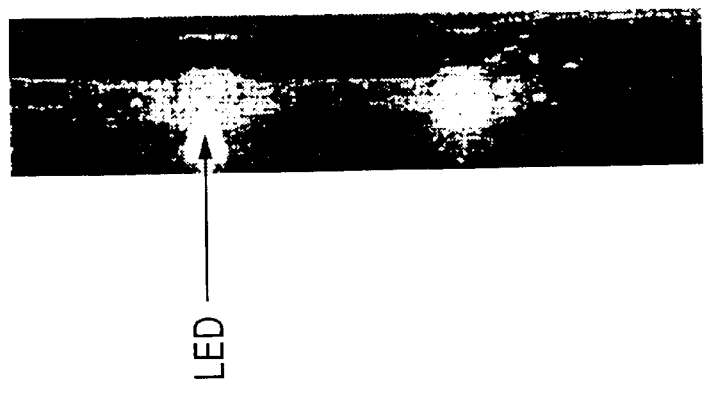
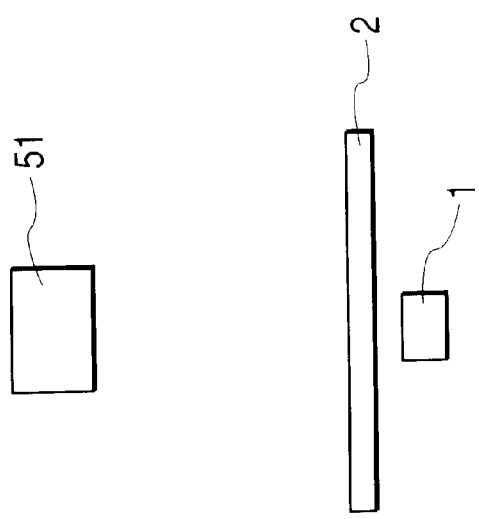

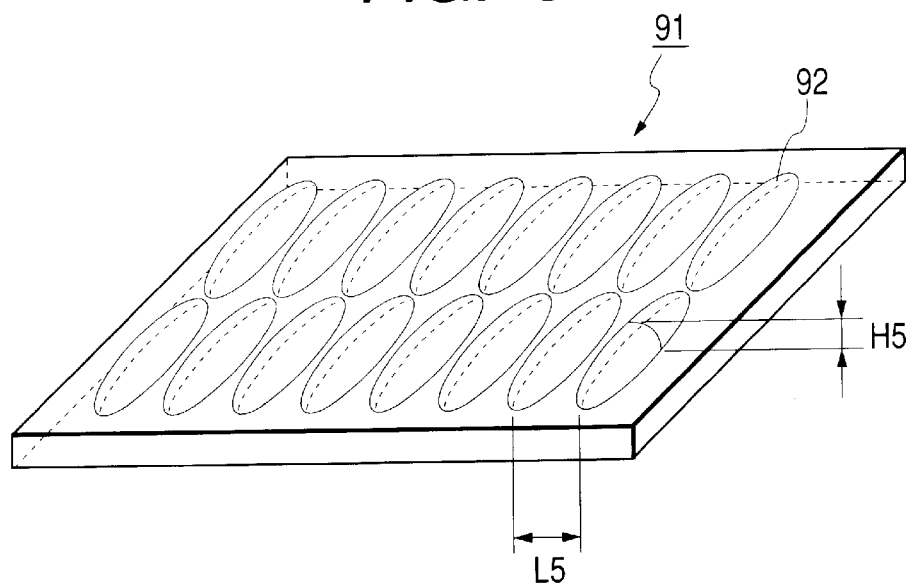
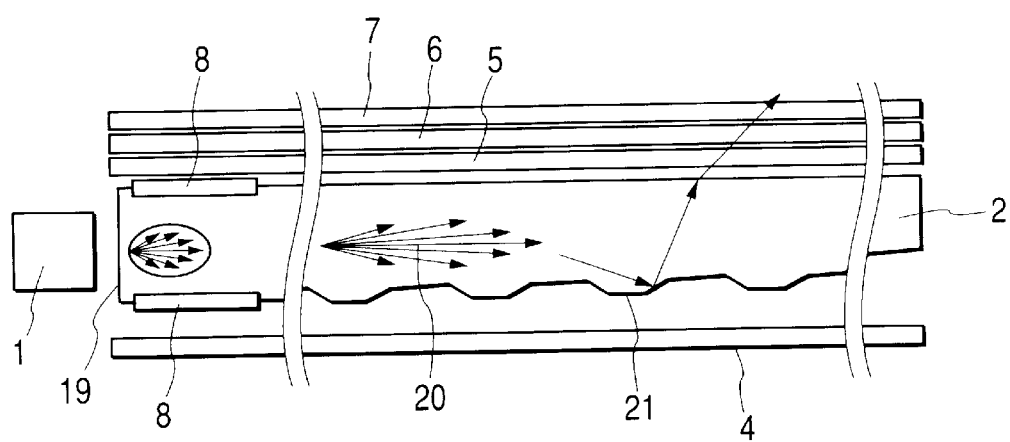

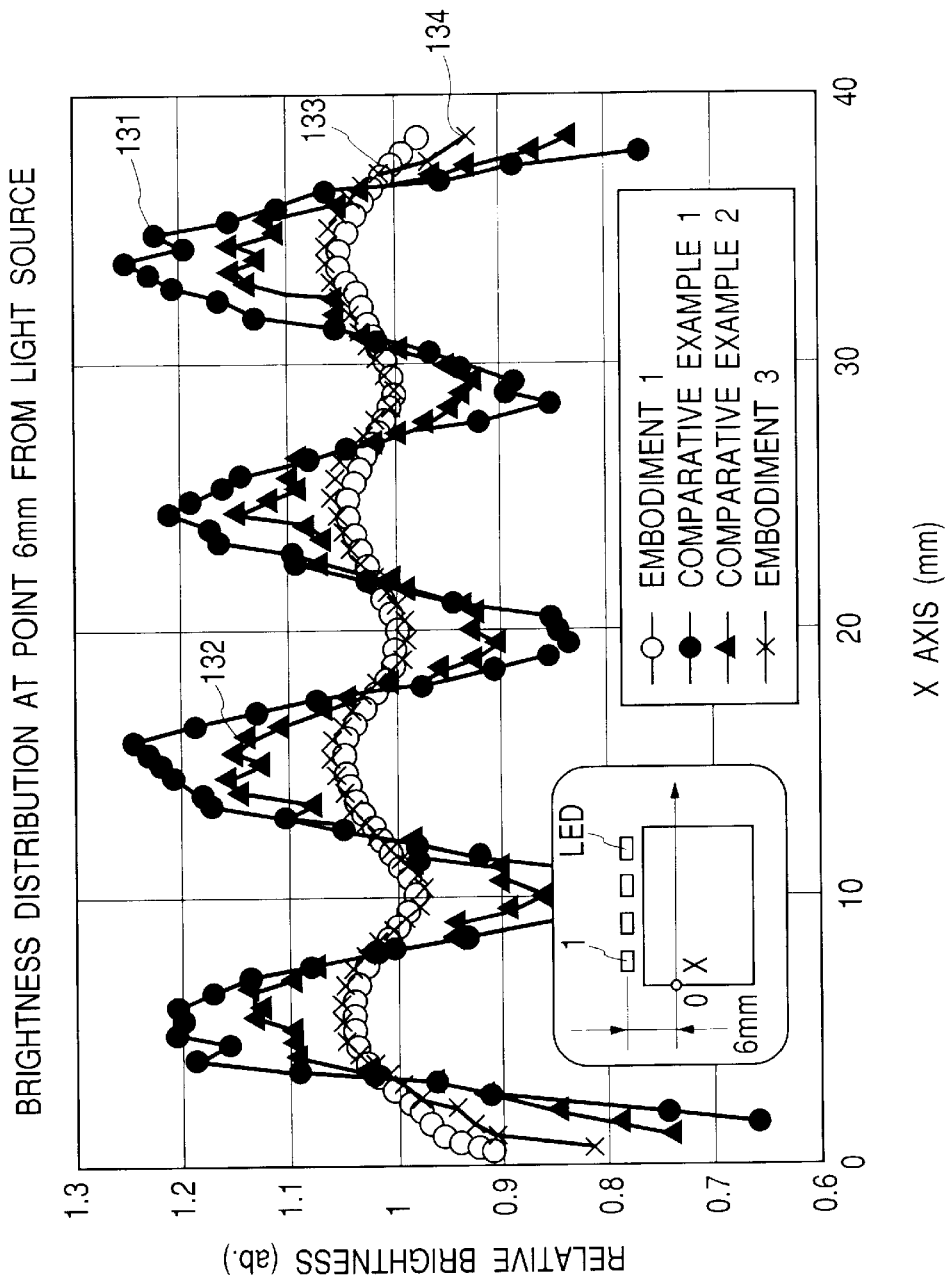

BACKLIT LIGHTING DEVICE, LIQUID CRYSTAL DISPLAY DEVICE UTILIZING SAME, AND LIQUID CRYSTAL DISPLAY DEVICE MANUFACTURING METHOD

FIELD OF THE INVENTION

The present invention relates to a liquid crystal display device member for backlit lighting devices, liquid crystal display devices utilizing that member and also liquid crystal display device manufacturing technology.

DESCRIPTION OF THE RELATED ART

In recent years compact, low priced and low current consumption portable information terminals and cellular telephones have come into widespread use. Display devices for this equipment normally use a transreflective liquid crystal display device for both good screen (image visibility) recognition when outdoors in daylight and good screen (image visibility) recognition in dark locations. Along with the trend towards portable information terminals and cellular telephones having color screens and moving images, the need has arisen for backlit light source devices having high brightness but no dark spots and that light the entire flat surface of the screen.

FIG. 2 shows a backlit lighting device of the related art having compact liquid crystal display elements for use in portable information terminals and cellular telephones.

A perspective view of the backlit lighting device of the related art is shown in FIG. 2. As shown in the figure, light emitting diodes are mainly used as the light source 1 in view of the need to limit power consumption and save mounting space. These (LED) are installed on the edge of a light guide plate 2 made of transmittant material, and a reflective plate 4 for reflecting light and dots 3 for reflecting, transmitting and scattering light on the upper and lower surfaces of the light guide plate, and a diffuser plate 5 made from opaque synthetic plastic having a light scattering effect for evenly distributing the lighting surface brightness on the upper surface of light guide plate 2 over the entire surface are installed. Further, a first prism sheet 6 and a second prism sheet 7 are installed on that upper surface to concentrate the diffused light to some extent, and improve the brightness on the front side of the display device. The reference numeral 9 in the figure is the light emitted from the light source 1. A light/dark section is present near the position where the light source 1 for the light guide plate 2 is installed and is therefore masked by a frame (not shown in drawing).

However, the light emitting diodes constituting the light source 1 were a point light source, causing the problem that dark spots appeared near the display surface of the light source 1 degrading the display quality. Measures to reduce these dark spots on the light emitting diodes of light source 1 were to increase the number of light emitting diodes, and to lengthen the distance between the display surface and the light source 1. However, these measures had the problem that if the number of light source 1 were increased then power consumption became larger and the cost is increased. If the distance the display surface and the light source 1 is increased then the available display area is diminished.

Methods were also disclosed in the related art in Japanese Unexamined Patent Publication No. 259623/1999, Japanese Unexamined Patent Publication No. 2001-110224, and Japanese Unexamined Patent Publication No. 2001-135121, to resolve the above mentioned problems by contriving a shape for the light guide input section of the light guide plate to reduce the dark spots. However, these methods had the problems that the light emitting diode and light guide plate required installation precision, a drop in brightness occurred due to the light spreading out from the light guide input section, the display area became narrow, there was less freedom in design of the backlight, optical (system) design was difficult, and mold manufacturing was difficult, etc.

A method on the other hand using a light guide element for changing the point light source into a line light source was disclosed in Japanese Unexamined Patent Publication No. 249759/1999. However, the light guide element has poor efficiency for turning the point light source into a line light source and the further problems that there was a drop in brightness, an increased number of parts were needed and the cost became high.

A technology of the related art was also disclosed in Japanese Unexamined Patent Publication No. 254618/1996 for decreasing the number of dark spots by forming a prism on the light guide input surface of the light guide plate. However, this method had many problems, namely that the brightness lines generated from the light source were not effective enough in preventing dark spots, manufacturing the mold for forming the prism on the light input surface was difficult, and further not all the light was reflected during reflection at the oblique surface portion and much of the light returning to the light source had low brightness.

A method of the related art for reducing dark spots by contriving a shape for the side surface of the light guide plate was also disclosed in Japanese Unexamined Patent Publication No. Hei 2000-299012. However, this method also had problems such as that optical (system) design was difficult, there was little freedom in the backlight design, and mold manufacture was difficult, etc.

The methods of the related art were therefore able to reduce the dark spots but also drawbacks due to the various problems that arose and eliminating these problems was impossible.

SUMMARY OF THE INVENTION

The present invention therefore has the object of resolving the problems of the related art by providing a backlit lighting technology capable of reducing dark spots. In order to achieve the above objects, the liquid crystal display device of the present invention is comprised of a backlit lighting device containing a light guide plate, a light source installed on the side surface of the light guide plate, and light directional diffusing elements formed on either the upper surface or lower surface of the light guide plate near the light source and, a liquid crystal element, wherein the light emitted from the backlit lighting device is irradiated onto the liquid crystal element.

The light directional diffusing elements are hologram elements, diffraction gratings, cylindrical lenses array or microlens arrays.

In the case of hologram elements, the height of the elements is 3 to 30 micrometers, and the element height divided by the element gap is at least 0.15. In the case of diffraction gratings, the height of the diffraction gratings is 3 to 30 micrometers, and the diffraction grating height divided by the grating gap is at least 0.15. In the case of the cylindrical lens array, the height of the lens is 3 to 30 micrometers, and the lens height divided by the grating gap is at least 0.15, the shape of the lens cross section is a portion of an ellipse, and the length of the flat section of the lens is 2 to 10 micrometers. In the case of the microlens array, the microlens flat surface shape is circular, elliptical, hexagonal, quadrangular or square with rounded edges, and that lens height is 3 to 30 micrometers, and the lens height divided by the lens gap is at least 0.15.

Further, a plurality of microdots made from a plurality of small protrusions or small depressions are formed on the upper surface or on the lower surface on the light guide plate near the light source, to change the light progression direction that the plane light is emitted from the light source, and the hologram element height or diffraction grating height or lens height of the cylindrical lens are essentially the same as the height (depth).

The flat surface of the microdot may be elliptical or a square with rounded edges with a length (long side) of 20 to 100 micrometers, and a value from 1 through 5 for long side divided by short side, and a dot cross sectional shape that is a portion of an ellipse, and a dot height of 3 to 30 micrometers. Further, the number of dots, and/or shape and/or size may be changed as needed to achieve a uniform brightness distribution.

These and other objects, features and advantages of the invention will become apparent from the following more particular description of the preferred embodiments of the invention as illustrated in the accompanying drawings.

BRIEF DESCRIPTION OF THE DRAWINGS

FIG. 3A is a drawing showing placement when light from the light source is transmitting through the light guide plate during filming with the camera;

FIG. 3B is an image captured when a hologram element is not formed on the light guide plate;

FIG. 3C is an image captured when a light-directivity diffusion element such as a hologram element is formed on the light guide plate.

FIG. 9 is a perspective view showing an embodiment of the microlens array used in the backlit lighting device of the present invention.

FIG. 10 is a perspective view showing light ray tracks of the light progressing through the light guide plate of the light-directivity diffusion element in the present invention.

FIG. 13 is a device characteristics chart showing relative brightness for describing the effect of the present invention.

DESCRIPTION OF THE PREFERRED EMBODIMENTS

Figure 1:
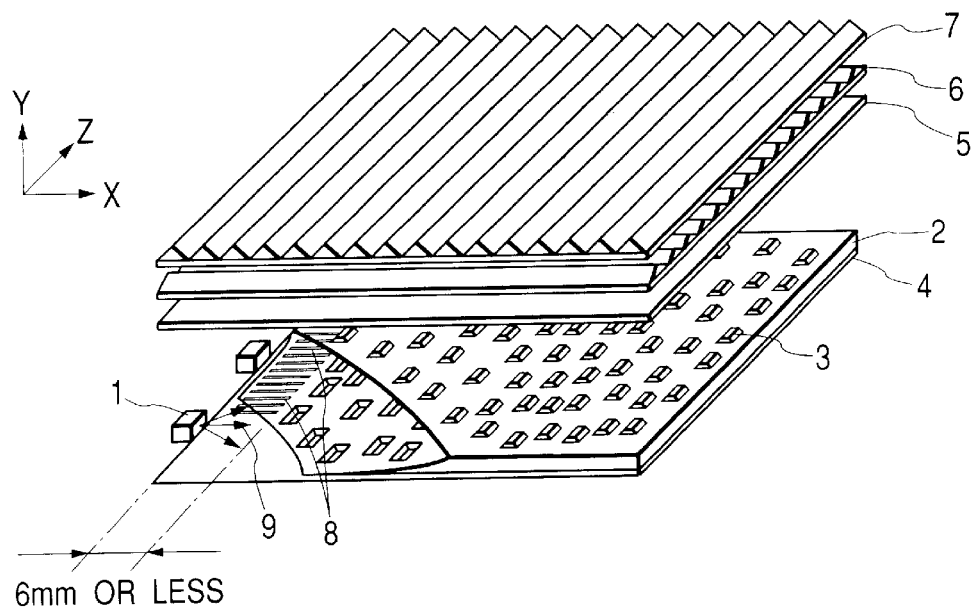
FIG. 1 is a perspective view showing the first embodiment of the backlit lighting device of the present invention.
Figure 2:
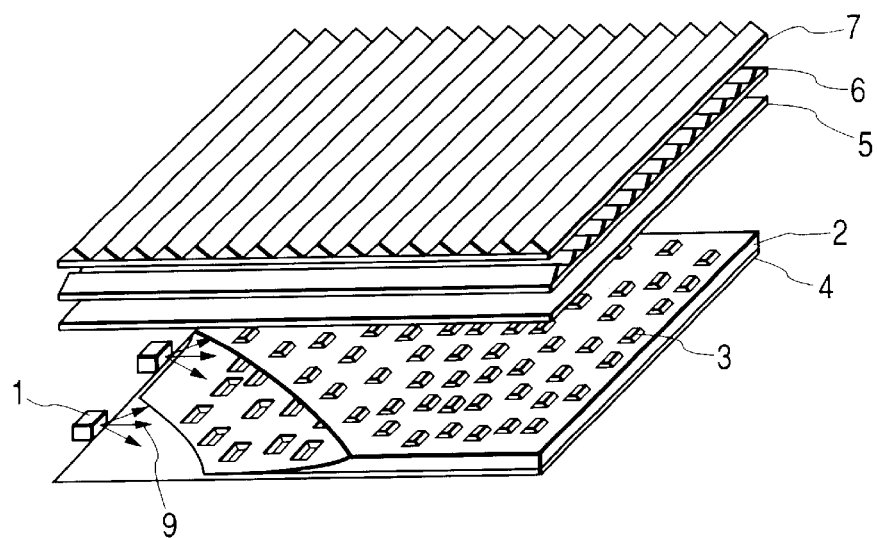
FIG. 2 is a perspective view showing the backlit lighting device of the related art.

The embodiments of the present invention are described hereafter while referring to the examples in the drawings.

FIG. 1 is an oblique view showing the first embodiment of the backlit lighting device of the present invention. As shown in the figure, a light-directivity diffusion element such as hologram elements, diffraction gratings, cylindrical lens arrays or microlens arrays is formed on the upper surface of the light guide plate 2 and/or the lower surface of the light guide plate 2 near the light source 1. In the present embodiment, "on the upper surface of the light guide plate 2 and/or the lower surface of the light guide plate 2 near the light source 1" refers to an area of a distance less than 6 millimeters from the light source 1 on the upper surface of light guide plate 2 and/or lower surface of light guide plate 2 so that the there will be no overlapping onto the liquid crystal element display section during assembly onto the liquid crystal display device.

Forming a greater number of light-directivity diffusion elements 8 comprised of hologram elements, diffraction gratings, cylindrical lens arrays or microlens arrays on the upper surface and/or lower surface of light guide plate 2 near the light source 1 than is necessary, will cause a drop in brightness because the light will spread out too much, making it necessary to adjust them within a range in proximity to the light source on the upper surface and/or lower surface of the light guide plate according to the surface area and location.

The light-directivity diffusion elements of the present embodiment, makes the light from the light source directional along the light guide plate surface, by arraying multiple light sections in parallel along the optical axis of the light from the light source, on the lower surface or upper surface of the light guide plate 2 near the light source, these elements also diffuse the light along the flat surface of the light guide plate.

FIGS. 3A to 3C shows views illustrating the diffusion of light with and without a hologram.

FIG. 3A is a drawing showing placement to obtain the images of FIG. 3B and FIG. 3C. FIG. 3B is an image captured when a hologram element is not formed on the light guide plate; FIG. 3C is an image captured when a light-directivity diffusion element such as a hologram element is formed on the light guide plate. FIG. 3B and FIG. 3C, as shown in FIG. 3A, are images captured with a camera 51 when light from a light source 1 such as an LED is transmitted through the light guide plate 51. The case of FIG. 3B, is a point light source, and where no hologram element is formed on the light guide plate 2. FIG. 3C shows the case where a hologram element was formed on the light guide plate 2 and the light from light source 1 propagates along the surface. The light from the point light source is in this way changed to linear light by the hologram element. Taking advantage of this effect prevents dark spots forward of the light source 1.

Figure 4:
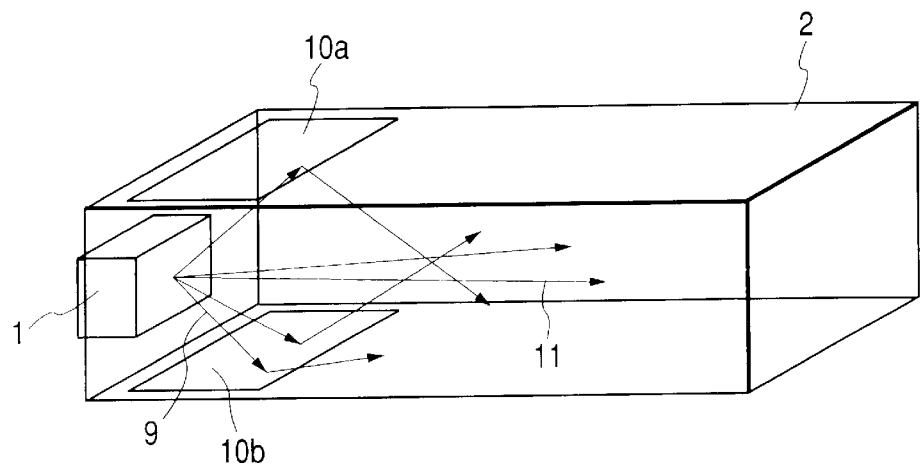
FIG. 4 is a diagram showing the effect of the hologram element in reducing the dark spots.

FIG. 4 is a diagram showing the effect of the hologram element in reducing dark spots. This figure shows the light tracks of the (wavelength) light proceeding through the light guide plate 2 near light source 1. The light 9 emitted from the light source 1 in FIG. 4 enters the light-directivity diffusion element formed at the light input section of light guide plate 2 and for example, strikes the hologram elements 10a, 10b and the light from the point light source is changed to line light and guided through the light source 1 area. Light that does not strike the hologram elements 10a and 10b remains unchanged as point light. The light guide plate (light source) section of FIG. 4 can therefore approximate the light guide plate (light source) section of FIG. 5.

Figure 5:
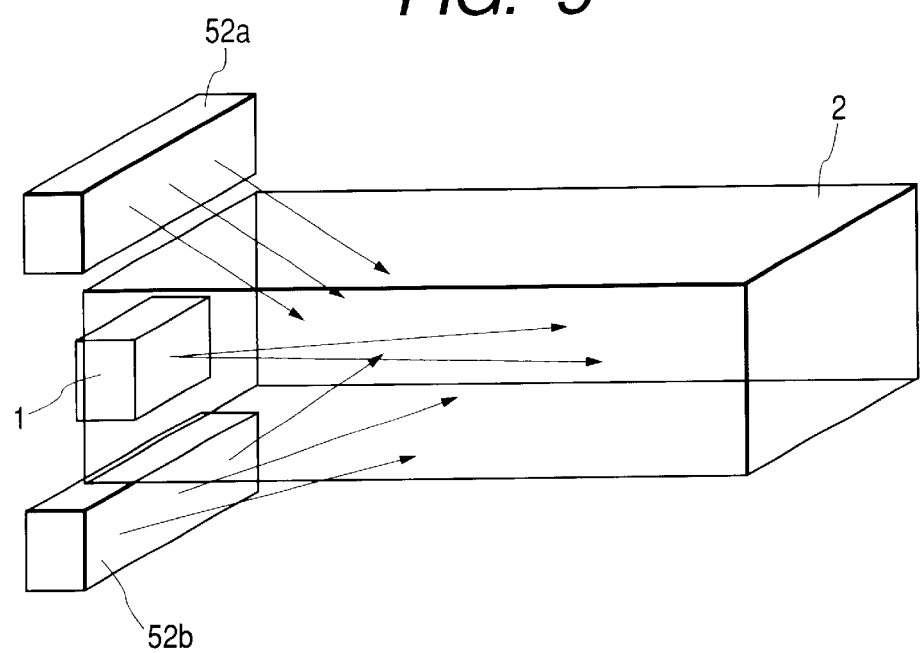
FIG. 5 is a diagram showing a light guide plate light source section approximating the light guide plate light source of FIG. 4.

FIG. 5 is a diagram showing a light guide plate (light source) section approximating the light source of the light guide plate (light source) of FIG. 4. In this figure, reference numeral 52 denotes the light source changed into line light by the hologram elements 10a, 10b. The point light source 1 and the line light source power supplies 52a, 52b formed above and below the light guide plate 2 have the same effect. The position and light emission intensity of the line power supply can be regulated by the surface area and position of the hologram element. The surface area and position of the hologram elements must be optimized along with reducing the dark spots by (optimizing) the dot density distribution. Increasing the surface area of the hologram elements too much at this time, will help reduce dark spots but will be disadvantageous in terms of brightness, so that after optimizing the dot density distribution, the surface area of the hologram element is preferably increased in steps to eliminate dark spots and find the ideal value.

Figure 6:
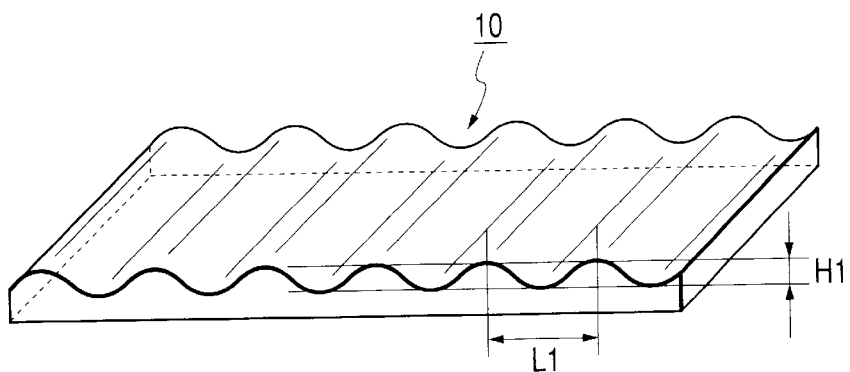
FIG. 6 is a perspective view showing an embodiment of the hologram element used in the backlit lighting device of the present invention.

Various items can be utilized as the hologram element 10 but a corrugated hologram element shown in FIG. 6 is used as a typical item.

FIG. 6 is a perspective view showing an embodiment of the hologram element used in the backlit lighting device of the present invention. A hologram element 10 is used as the light-directivity diffusion element in the present example. The height H1 of the corrugated hologram element 10 is 3 to 40 micrometers and the element gap L1 is in a range of 10 to 120 micrometers. Further, the element height divided by element gap (H1/L1) is preferably in a range of 0.15 to 1.0. More preferably, the hologram element 10 has a height H1 of 3 to 25 micrometers and an element gap L1 in a range of 20 to 60 micrometers, and further the element height divided by element gap (H1/L1) is preferably in a range of 0.15 to 0.5. The light guide section on the hologram element 10 forms the peaks between the ridges. These light guide sections are arrayed in parallel along the optical path of the light emitted from the multiple light sources 1.

The reasons for limiting the size of the element are as follows. When the height H1 of the hologram element 10 is greater than 40 micrometers, the resist layer is too thick during stamping which makes production difficult. More preferably, the height H1 of the hologram element 10 is made within 25 micrometers. This height is used because the dot height and hologram element height H1 must be the same since the dot 3 and hologram element 10 are manufactured simultaneously in the mold. Making the height H1 of the hologram element 10 greater than 25 micrometers may cause the dot to become too big and the dot itself may become visible. The hologram element 10 height is preferably 3 micrometers or more. This height is recommended in view of the need to make the dot height and hologram element height H1 the same since the dot 3 and hologram element 10 are manufactured simultaneously in the mold. When the hologram element 10 height is less than 3 micrometers, the sloping surface area of the dot becomes too small making it difficult to obtain uniform brightness distribution.

The gap L1 for the hologram element 10 is preferably within 120 micrometers. This dimension is used because at a hologram element gap L1 of more than 120 micrometers, these become mere surface irregularities and cannot be expected to function as the hologram elements 10. More preferably, the gap L1 for the hologram element 10 is within 60 micrometers. This dimension is used because a hologram element 10 gap L1 of less than 60 micrometers is necessary for obtaining a hologram element effect within a range sufficient to allow easy manufacture at the (above) hologram element height. If the hologram element 10 gap L1 is less than 10 micrometers, an inexpensive mask and contact optical aligner cannot be utilized and the manufacturing cost becomes too large. When using an inexpensive filter mask, the hologram element gap L1 is preferably 20 micrometers or more. The effect of the hologram element 10 can be increased by increasing the hologram element 10 height divided by hologram element gap (H1/L1) However, injection molding is difficult when this value is set at 1.0 or more, and further, the effect rendered by the hologram element 10 becomes too large and the brightness deteriorates so this value is not recommended. This value is more preferably within 0.5 in view of the need for injection molding transferability. If the hologram element 10 height divided by hologram element gap (H1/L1) is set 0.15 or less, these become mere irregularities and cannot be expected to function as the hologram element 10.

Figure 7:
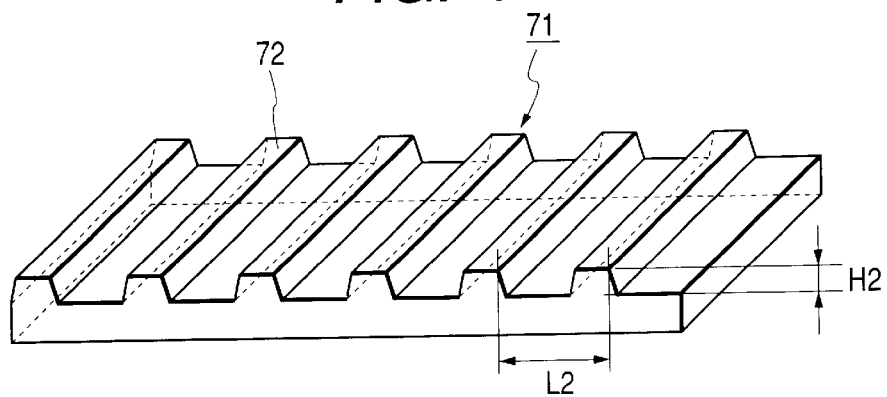
FIG. 7 is a perspective view showing an embodiment of the diffraction grating used in the backlit lighting device of the present invention.

Different items can be utilized as the diffraction grating constituting one of the light-directivity diffusion elements 8, however the rectangular diffraction grating shown in FIG. 7 is a typical item used.

FIG. 7 is a perspective view showing an embodiment of the diffraction grating used in the backlit lighting device of the present invention. In this embodiment, a diffraction grating is utilized as the light-directivity diffusion element. In the figure, the reference numeral 71 denotes the diffraction grating, and reference numeral 72 is the light guide section. Preferably, the height H2 of the diffraction grating 71 is in a range from 3 to 40 micrometers, and the diffraction grating gap L2 is from 10 to 120 micrometers. Further, the diffraction grating height divided by diffraction grating gap (H2/L2) is preferably 0.15 through 1.0. Even more preferably, the height H2 is in a range from 3 to 25 micrometers, the diffraction grating gap L2 is in a range from 20 to 60 micrometers, and the diffraction grating height divided by diffraction grating gap (H2/L2) is preferably 0.15 through 0.5.

The size of the diffraction grating is limited to the above dimensions for the following reasons. When the height H2 of the diffraction grating is greater than 40 micrometers, the resist layer is too thick during stamping which makes production difficult. More preferably, the height H2 of the diffraction grating is set within 25 micrometers. This height is used because the dot height and diffraction grating H2 must be the same since the dot 3 (see FIG. 1) and the diffraction grating a remanufactured simultaneously in the mold. Making the height H3 of the diffraction grating greater than 25 micrometers may cause the dot 3 to become too big and the dot itself might become visible. The diffraction grating height H2 is preferably 3 micrometers or more. This height is recommended in view of the need to make the dot height and diffraction grating height H2 the same since the dot 3 and diffraction grating are manufactured simultaneously in the mold. When the diffraction grating height H2 is less than 3 micrometers, the sloping surface area of the dot becomes too small making it difficult to obtain uniform brightness distribution.

The gap L2 for the diffraction grating 71 is preferably within 120 micrometers. This dimension is used because at a diffraction grating 71 gap L2 of more than 120 micrometers, these become mere surface irregularities and cannot be expected to function as the diffraction gratings. More preferably, the gap L2 for the diffraction grating 71 is within 60 micrometers. This dimension is used because a diffraction grating 71 gap L2 of less than 60 micrometers is necessary for obtaining a diffraction grating effect within a range sufficient to allow easy manufacture at the (above) diffraction grating height. If the diffraction grating 71 gap L2 is less than 10 micrometers, an inexpensive mask and contact optical aligner cannot be utilized and the manufacturing cost becomes too large. When using an inexpensive filter mask, the diffraction grating gap L2 is preferably 20 micrometers or more. The effect of the diffraction grating 71 can be increased by increasing the diffraction grating height divided by the diffraction grating gap (H2/L2). However, injection molding is difficult when this value is set at 1.0 or more, and further, the effect rendered by the diffraction grating 71 becomes too large and the brightness deteriorates so this value is not recommended. This value is more preferably within 0.5 in view of the need for mold transferability. If the diffraction grating 71 height divided by diffraction grating gap (H2/L2) is set to 0.15 or less, these become mere irregularities and cannot be expected to function as the diffraction gratings 71.

Figure 8:
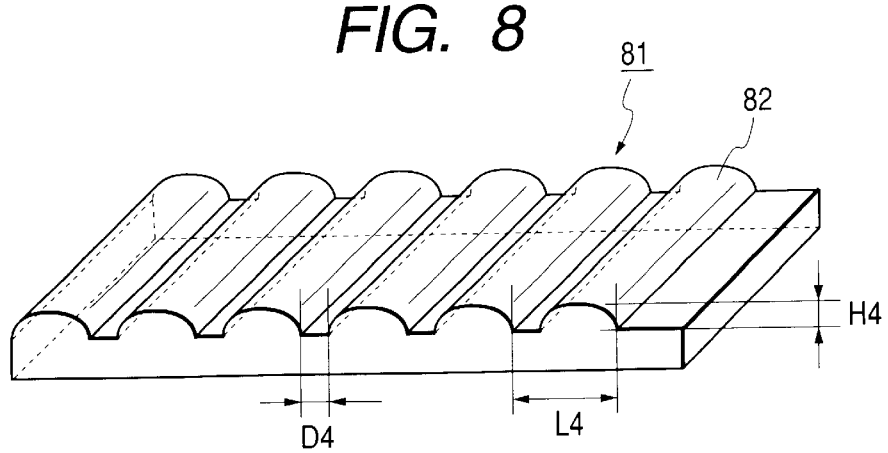
FIG. 8 is a perspective view showing an embodiment of the cylindrical lens array used in the backlit lighting device of the present invention.

A cylindrical lens array can be utilized as the element with the structure shown in FIG. 8. FIG. 8 is a perspective view showing an embodiment-of the cylindrical lens array used in the backlit lighting device of the present invention. This embodiment shows the case when a cylindrical lens array is utilized as the light-directivity diffusion element. In the figure, the reference numeral 81 denotes the cylindrical lens array, the reference numeral 82 denotes the cylindrical lens, functioning as the light guide section. When the height of each cylindrical lens is H4, the gap between each cylindrical lens is L4, and the length of the lens flat section is D4, preferably the lens height H4 is in a range from 3 to 40 micrometers, the lens height divided by lens gap (H4/L4) is 0.15 to 1.0, and the length of the flat section D4 on the lens is 2 to 10 micrometers, and the lens cross sectional shape is preferably a portion of an ellipse.

More preferably, the cylindrical lens height H4 is in a range from 3 to 25 micrometers, the cylindrical lens gap L4 is 20 to 60 micrometers and further the lens height divided by lens gap (H4/L4) is 0.15 to 0.5.

The size of the cylindrical lens 82 is limited to the above dimensions for the following reasons. When the height H4 of the lens is greater than 40 micrometers, the resist layer is too thick during stamping which makes production difficult. More preferably, the height H4 of the lens is set within 25 micrometers. This height is used because the dot height and cylindrical lens 82 must be the same since the dot 3 (see FIG. 1) and the cylindrical lens 82 are manufactured simultaneously in the mold. Making the height H4 of the cylindrical lens greater than 25 micrometers may cause the dot 3 to become too big and the dot itself might become visible. The cylindrical lens height H4 is preferably 3 micrometers or more. This height is recommended in view of the need to make the dot height and cylindrical lens height H4 the same since the dot 3 and cylindrical lens 82 are manufactured simultaneously in the mold. When the cylindrical lens 82 height H4 is less than 3 micrometers, the sloping surface area of the dot becomes too small making it difficult to obtain uniform brightness distribution. The effect of the cylindrical lens array 81 can be increased by increasing the cylindrical lens height divided by the cylindrical lens gap (H4/L4). However, injection molding is difficult when this value is set at 1.0 or more, and further, the effect rendered by the cylindrical lens array 81 becomes too large and the brightness deteriorates so this value is not recommended. This value is more preferably within 0.5 in view of the need for mold transferability. If the lens height divided by the lens gap (H4/L4) is set to 0.15 or less, these become mere irregularities and cannot sufficiently function as the cylindrical lens array 81.

FIG. 9 is a perspective view showing an embodiment of the microlens array used in the backlit lighting device of the present invention. This embodiment shows the case when the microlens array is utilized as the light-directivity diffusion element. In the figure, the reference numeral 91 denotes the microlens array, the reference numerals 92a, 92b denote the microlenses, and the two microlenses form one light guide section.

When the height of each microlens 92 is set as H5, the gap between the microlenses is set as L5, a variety of microlenses can be used. Different shapes can be utilized for the flat surface shape of the microlens but circular, elliptical, hexagonal, quadrangular or a square with rounded edges are suitable shape because they can increase the coverage rate of the lens sufficiently. This lens height H5 is preferably 3 to 40 micrometers, the lens height divided by the lens gap (H5/L5) is preferably 0.15 to 1.0. More preferably the lens height H5 is 3 to 25 micrometers, and the lens height divided by the lens gap (H5/L5) is more preferably 0.15 to 0.5.

The size of the lens is limited to the above dimensions for the following reasons. When the height H5 of the lens is greater than 40 micrometers, the resist layer is too thick during stamping which makes production difficult. More preferably, the height H5 of the lens is set within 25 micrometers. This height is used because the dot 3 height and lens must be the same since the dot 3 (see FIG. 1) and the microlens array 91 are manufactured simultaneously in the metal mold. Making the height H5 of the lens greater than 40 micrometers may cause the dot 3 to become too big and the dot size itself may become visible. Therefore, the cylindrical lens height H5 is preferably 3 micrometers or more. This height is recommended in view of the need to make the dot height and lens height H5 the same, since the dot 3 and microlens array 91 are manufactured simultaneously in the mold. However, when the lens height H5 is less than 3 micrometers, the sloping surface area of the dot becomes too small making it difficult to obtain uniform brightness distribution. The effect of the microlens array 91 can be increased by increasing the cylindrical lens height divided by the cylindrical lens gap (H5/L5). However, injection molding is difficult when this value is set at 1.0 or more, and further, the effect rendered by the microlens array becomes too large and the brightness deteriorates so this value is not recommended. This value is more preferably within 0.5 in view of the need for mold transferability. If the lens height divided by the lens gap (H5/L5) is set to 0.15 or less, these become mere irregularities and cannot sufficiently function as the microlens array.

FIG. 10 is a perspective view showing light ray tracks of the light progressing through the light guide plate of the light-directivity diffusion element in the present invention. The light input from the light source 1 is irradiated onto the (light source side) end surface 19 of light guide plate 2 having a light-directivity diffusion element 8, and becomes wave light 20. A portion of the wave light 20 is made into line light by the directivity diffusion element 8 (for example, hologram element). Then the light proceeds to the other end while repeatedly reflecting from the light guide plate lower surface and light guide plate emission surfaces. The light from the wave light emitted onto the small protruding oblique surface of the lower surface of light guide plate 2, is reflected and strikes the light emission surface and is there refracted and emitted from the light emission surface as emitted light. The light that was not reflected becomes transmitted light from the oblique surface of dot 21, is reflected by the reflecting plate and again input to the light guide plate 2, and a portion of that light is emitted from the light emission surface, and the remainder again becomes the wave light 20. Or the light input to the small protruding oblique surface of the upper side of the light guide plate, is refracted and emitted from the light emission surface as emitted light. Then, the light that was not reflected becomes light transmitted through the dot oblique surface and is reflected off of the reflecting plate 4 and again irradiated onto the light guide plate, where a portion is emitted from the emission surface, and the remainder again becomes the wave light 20. The emitted light is concentrated by the diffuser plate 5, and a first prism sheet 6, and, a second prism sheet 7, and illuminates the liquid crystal element. Therefore, by correct placement of the dot 3 of light guide plate 2, the guided wave light is steadily emitted from the light guide plate and can illuminate the liquid crystal display element.

The dot 3 shape is hereafter explained while referring to FIG. 11.

Figure 11A:
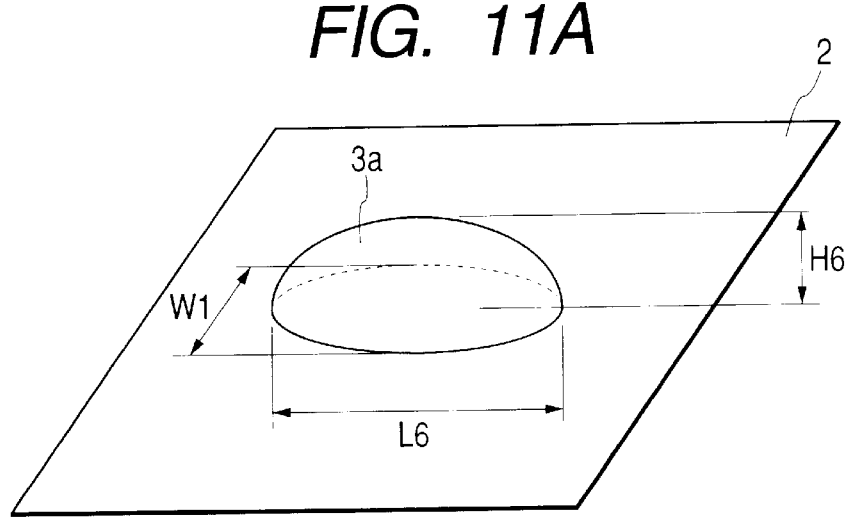
FIG. 11A and FIG. 11B are perspective drawings showing examples of dots formed on the light guide plates.
Figure 11B:
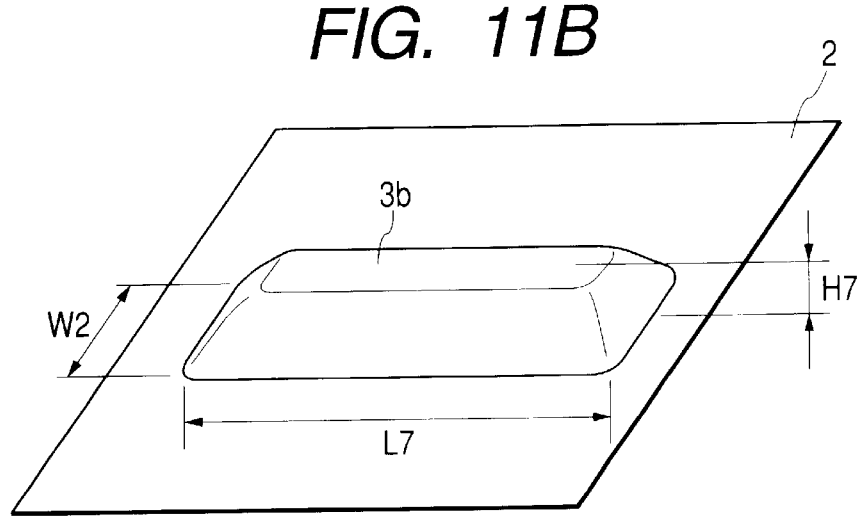

FIG. 11 is perspective drawings showing examples of dots formed on the light guide plates. The example in FIG. 11A shows an elliptical shape, and the example in FIG. 11B shows a square shape with rounded edges. There are no particular limitations, and different dot shapes can be used but preferably the elliptical dot shape 3a shown in FIG. 11A or the rounded edge square shape dot 3b shown in FIG. 11B are used. These shapes can efficiently reflect the light from the light source. Each length L6, L7 (long side) of the dots 3a, 3b is preferably 20 to 100 micrometers, and the length (L6, L7) divided by short (side) (W1, W2) of (L6/W1, or L7/W2) is preferably 1 to 5. When the length (L6, L7) is made more than 100 micrometers, the dot size becomes a problem. Also, when the dot is made less than 20 micrometers, the dots are too numerous and manufacturing becomes a problem. When the value for the (L6/W1, or L7/W2) is made more than 5, the short side becomes too small making manufacturing difficult. A portion of the dot 3 is preferably elliptical in shape, because this improves the dot reflectivity rate. Further, the height of the directivity diffusion element 8 such as the hologram element 10, diffraction grating 71, cylindrical lens array 81, or microlens array 91 may be made essentially the same as the height of the dot 3 forming the light guide plate 2 lower surface or upper surface.

Therefore as shown in FIG. 13, FIG. 14, and FIG. 15, in the manufacturing process described later on, the directivity diffusion elements 8 such as the hologram element 10, diffraction grating 71, cylindrical lens array 81, or microlens array 91 can be made simultaneously with the microdot 3, so that the cost can be kept low. If manufacture of the hologram element 10, diffraction grating 71, cylindrical lens array 81, or the microlens array 91 is attempted by for example machining them, the cost will be exceedingly high. Considering the need to make multiple prototypes, manufacture by (machine tool) machining is not practical.

Embodiments of the invention and comparative examples showing their effect are described next while referring to the work drawings.

The backlit lighting device shown in FIG. 1, the hologram element 10 as the directivity diffusion element 8 shown in FIG. 6, and the dots 3a, 3b shown in FIG. 11A and FIG. 11B are combined as the first embodiment of the liquid crystal display device of the present invention.

In the backlit lighting device of the present embodiment, the minimum structural elements are the light source 1, light guide plate 2, and reflective plate 4. Other than the main structural elements, a diffuser plate 5, and first and second prism sheets 6 and 7 are utilized to improve the display quality and to improve the frontal lighting in the first embodiment. The hologram element 10 of FIG. 6, is fabricated in the vicinity of the light source on the upper surface of the light guide plate 2 or on the lower surface of the light guide plate 2. The dots 3a, 3b shown in FIG. 11A and FIG. 11B on the upper surface and lower surface of the light guide plate 2 are formed placed at random on the light guide plate 2. There are no particular restrictions on the reflective plate 4, diffuser plate 5, first and second prism sheets 6 and 7, and the LED for the light source, and commonly used items may be utilized.

The comparative example 1 is the first embodiment with the hologram element 10 omitted. Otherwise, the structure and members are the same as the first embodiment.

Figure 12:
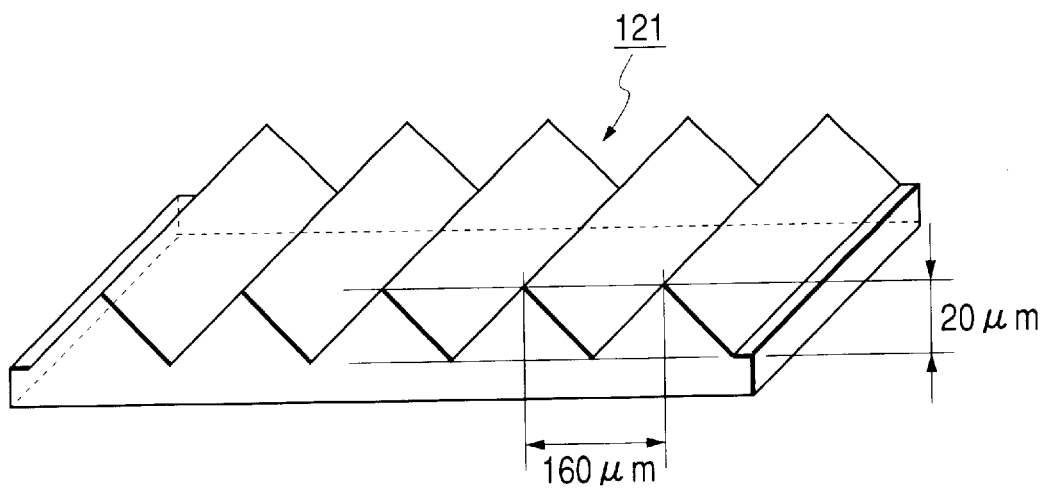
FIG. 12 is a perspective view showing a prism used as the substitute light-directivity diffusion element.

In the comparative example 2, the hologram element 10 of the first embodiment has been substituted with prism shown in FIG. 12.

FIG. 12 is a perspective view showing a prism used as the substitute light-directivity diffusion element. The height of the prism is 20 micrometers and the gap between the prisms is 160 micrometers.

FIG. 13 is a device characteristics chart showing relative brightness for describing the effect of the present invention. The horizontal axis is the X axis (millimeters), and a point 6 millimeters away from the multiple light sources 1 installation position is shown on a line along X axis (line paralleling the Z axis of FIG. 1). The vertical axis shows the relative brightness (ab.). In the figure, four LED are used as the light source 1, and in order to evaluate dark spots near the light source 1, results from straight and perpendicular measurement of the frontal brightness of a first embodiment, comparative example 1, and comparative example 2 at a point 6 millimeters from the light source 1 are shown. In the figure, the curve 131 indicates the comparative example 1, the curve 132 indicates the comparative example 2, and the curve 133 indicates the first embodiment. The second embodiment described later on, is essentially the same as the third embodiment and is shown by the curve 134.

In the device characteristics chart of FIG. 13, the dark spots on the four light input sections on curve 133 of the first embodiment can be seen to have greatly diminished compared to curve 131 of comparative example 1. Comparing curve 132 of comparative example 2 with curve 131 of comparative example 1 shows that dark spots have been reduced more on comparative example 2, the effect is small when compared with the dark spot reduction achieved in the first embodiment.

In the second embodiment, the wave hologram element 10 has been replaced with the diffraction grating 71 shown in FIG. 7. The effect is somewhat weaker when compared with that achieved in the first embodiment but the effect is large when compared with the first and second comparative examples. The diffraction grating 71 also has the advantage of being easier to manufacture than the wave hologram element 10.

In the third embodiment, the wave hologram element 10 has been replaced with the cylindrical lens array 81 shown in FIG. 8. The second embodiment and third embodiment have the same relative brightness so the characteristic curve of the second embodiment was omitted to avoid being unable to identify the curve on the work drawing. On comparing curve 133 of embodiment 1 with the curve 134 of embodiment 3, examination of the FIG. 13 shows the effect in reducing dark spots is somewhat weak compared to the first embodiment but the effect is large when compared with the first and second comparative examples. The third embodiment is somewhat less effective than the first embodiment in terms of reducing dark spots but has the same effect as the second embodiment using the diffraction grating. The cylindrical lens array 81 also has the advantage that manufacture is simple compared to the diffraction grating 71 and wave hologram element 10. The effect due to variations in light exposure can in particular be reduced when manufacturing the flat section of the lens. Taking the resolution of the mask into account, the length of this flat section is preferably 3 micrometers or more. Preferably, this flat section is less than 20 micrometers in order to obtain the dark spot reduction effect. If this flat section exceeds 20 micrometers, a dark spot reduction effect only equivalent to the prism of FIG. 12 will be obtained.

The manufacturing method for the backlit lighting device of the present invention is described next while referring to FIG. 14 through FIG. 16.

In the manufacturing method for the light guide plate, basically a metal mode is fabricated and plastic molding performed. The metal mold can be manufactured by various machine tool methods such as drilling, cutting, and grinding, etc. Electrical discharge machining is also an effective method. However, these methods are not preferable in manufacturing the hologram element, diffraction grating cylindrical lens array and microlens array of the present invention because the cost will be high.

By applying the manufacturing method of the invention related hereafter, the element and the dots on the lower and or the upper surface of the light guide plate can be formed simultaneously in the mold and the mold manufacturing cost can be greatly reduced.

FIG. 14 is cross sectional views showing each process of the first embodiment for manufacturing the light guide plate of the present invention.

Figure 14A:
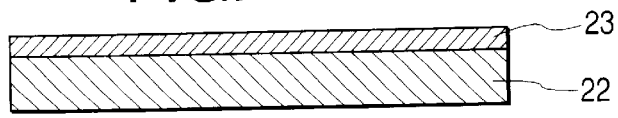
FIG. 14A through FIG. 14G are cross sectional views showing each process of the first embodiment for manufacturing the light guide plate of the present invention.
Figure 14B:
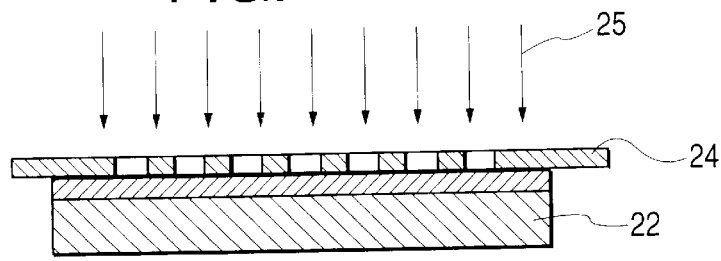
Figure 14C:
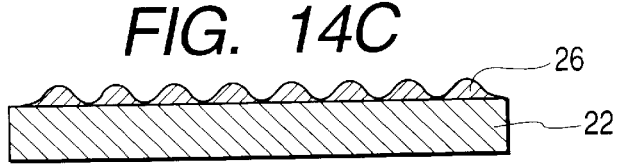
Figure 14D:
Figure 14E:
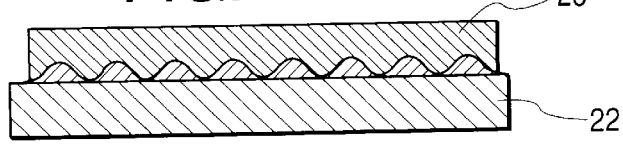
Figure 14F:
Figure 14G:
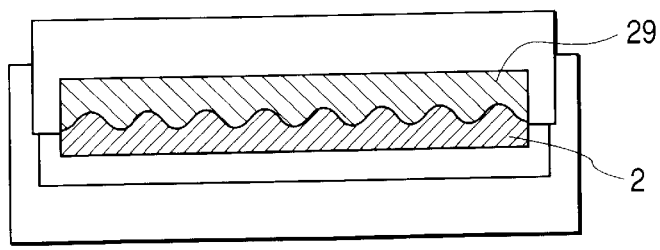
Figure 15A:
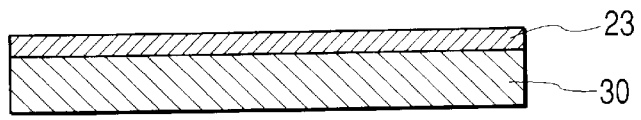
FIG. 15A through FIG. 15F are cross sectional views showing each process of the second embodiment for manufacturing the light guide plate of the present invention.
Figure 15B:
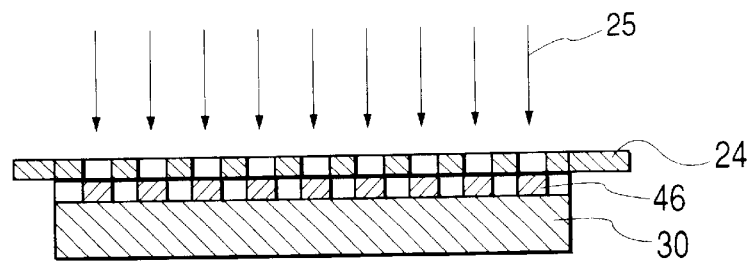
Figure 15C:
Figure 15D:
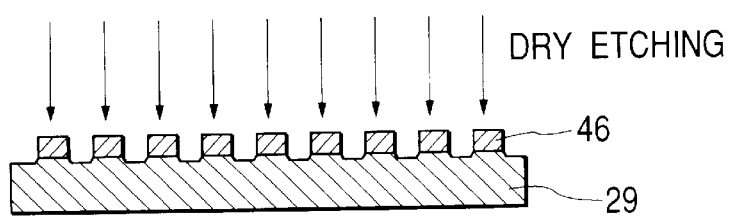
Figure 15E:
Figure 15F:
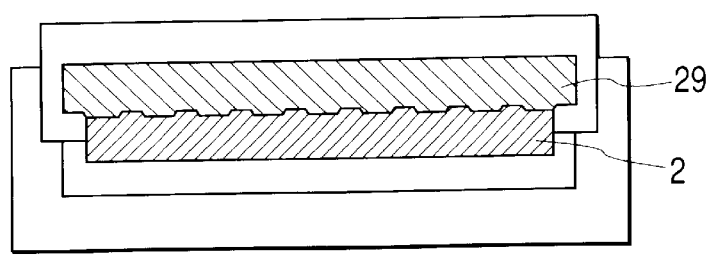
Figure 16A:
FIG. 16A through FIG. 16H are cross sectional views showing each process of the third embodiment for manufacturing the light guide plate of the present invention.
Figure 16B:
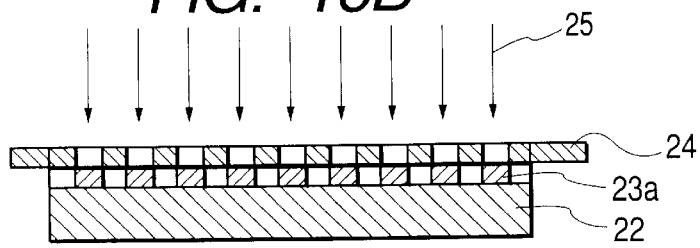
Figure 16C:
Figure 16D:
Figure 16E:
Figure 16F:
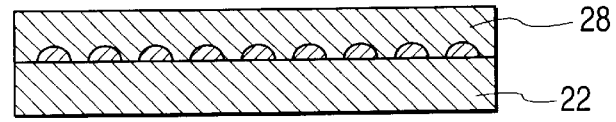
Figure 16G:
Figure 16H:
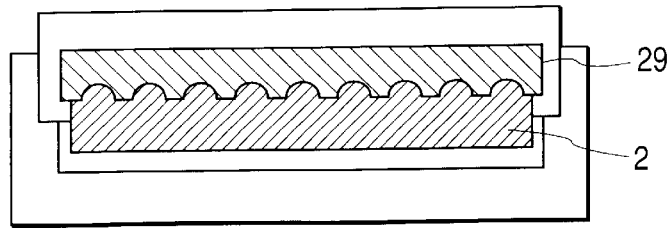

In FIG. 14A, the photoresist 23 layer is formed on the substrate 22. In FIG. 14B the photomask 24 containing the pattern for the dot 3 and hologram element 10, is placed on the substrate 22, ultraviolet rays 25 irradiated onto the mask from above and the photoresist 22 then developed. As shown in FIG. 14C, the pattern for the dots 3 and the pattern 26 for the hologram element 10 are formed on the substrate 22. In FIG. 14D, metal plating is formed on the pattern 26 and a metal film 27 formed. In FIG. 14E, after forming a metal plating on the metal film 27 to form a metal layer 28, this metal layer 28 is separated and a plastic mold stamper 29 formed as shown in FIG. 14F. The plastic is formed using the stamper 29 as shown in FIG. 14G, and a light guide plate 2 obtained.

The substrate 22 may be made from material such as glass plate with a mirror surface ground to a thickness from 2 to 10 millimeters. A silane type adhesive with good bonding characteristics can be applied beforehand, prior to forming the photoresist 23. A positive type or negative type material in a film or liquid state may be used as the photoresist material. FIG. 14 shows the process when using positive type material. Spin coating or roll coating may be used as methods for forming the material. The height of the small protrusions and the depth of the small depressions (concavities) can be controlled by changing the thickness of the photoresist.

The oblique angle of the cross sectional shape can be controlled by contriving suitable light exposure and developing conditions. Different types of masks such as chrome masks, film masks and emulsion masks can be used as the photomask. An image can be made with an electron beam or a laser beam by writing data beforehand for the dot size, quantity and distribution, etc. Forming the light guide film, before making the plating layer, will eliminate irregularities from the plating process, and allow forming a satisfactory plating layer, or in other words, a stamper. Different types of metals can be used as material for the metal layer, but nickel (Ni) is ideal in terms of uniformity, mechanical performance. The plating layer obtained can be easily physically removed from the substrate. If required, the material can be ground and used as a stamper. The stamper 29 that is obtained, can for example be secured to the host mold of the injection molder by magnets or vacuum chucks, etc.

FIG. 14 showed a method for manufacturing the light guide plate by using an injection molder but other methods may be utilized to form the light guide plate such as extrusion molding, compression molding and vacuum molding.

An overall transparent plastic material can be used as the material constituting the light guide plate. More specifically, these plastic materials may be acrylic type plastic, polycarbonate resin, polyacetyl resin, polyurethane resin, and ultraviolet ray hardened plastic material. Of these materials, the acrylic type material is ideal as material for the present invention because of its transparency, price and formability.

FIG. 15 is cross sectional views showing each process of the second embodiment for manufacturing the light guide plate of the present invention. As shown in FIG. 15A, a photoresist film 23 is formed on the stamper base disk 30. Next, a photomask 24 containing a dot pattern is positioned on the substrate 30 as shown in FIG. 15B, and developed after irradiating ultraviolet rays 25 onto the mask from above, and as shown in FIG. 15C, a directivity diffusion element 8 and pattern 46 for the dots 3 formed on the stamper base disk 30. Next, as shown in FIG. 15D, using the pattern 46 is used as a mask, and dry etching of the stamper base disk 30 performed to make the stamper 29. Then, as shown in FIG. 15E, the photomask 24 on the stamper is removed, the stamper completed, and as shown in FIG. 15G, the light guide plate 2 manufactured by plastic molding, using the stamper 29.

This manufacturing method differs from the process in FIG. 14 in that a metal plating process is not utilized in processing the light guide plate. The stamper 30 is for example, a mirror-finished metal plate made of nickel (Ni) etc. Besides wet etching, different types of dry etching may be used for etching the stamper base disk using the photomask pattern as a mask. Ion milling which can control the oblique angle of the cross section by irradiating an ion beam from a specified angle is a method particularly well suited to this invention. Generally used metal materials maybe utilized in the stamper 30 to directly manufacture a mold by the above method.

FIG. 16 is cross sectional views showing each process of the third embodiment for manufacturing the light guide plate of the present invention. As shown in FIG. 16A, a photoresist film 23 is formed on the substrate 22. Next, as shown in FIG. 16B for a flat-shaped pattern of small protrusions or small depressions (concavities) or a photomask 24 having an inverted pattern is positioned on the photomask film 23, ultraviolet rays irradiated onto the mask 24 from above and after developing, a dot pattern 23a made from small protrusions or small depressions (concavities) is formed on the substrate 22 as shown in FIG. 16C. The pattern 23a is next heated in a range from 150 to 200 degrees centigrade as shown in FIG. 16D, and the resist melted to flow and form the pattern 23b. The metal plating is next formed on the pattern 23b as shown in FIG. 16E. Next, as shown in FIG. 16F, a plating layer 28 is formed on the metal plating 27, and a plastic molding metal stamper 29 formed as shown in FIG. 16G. The light guide plate 2 is formed as shown in FIG. 16H by plastic molding using this stamper 29.

The structure of the liquid crystal display device is described next.

Figure 17:
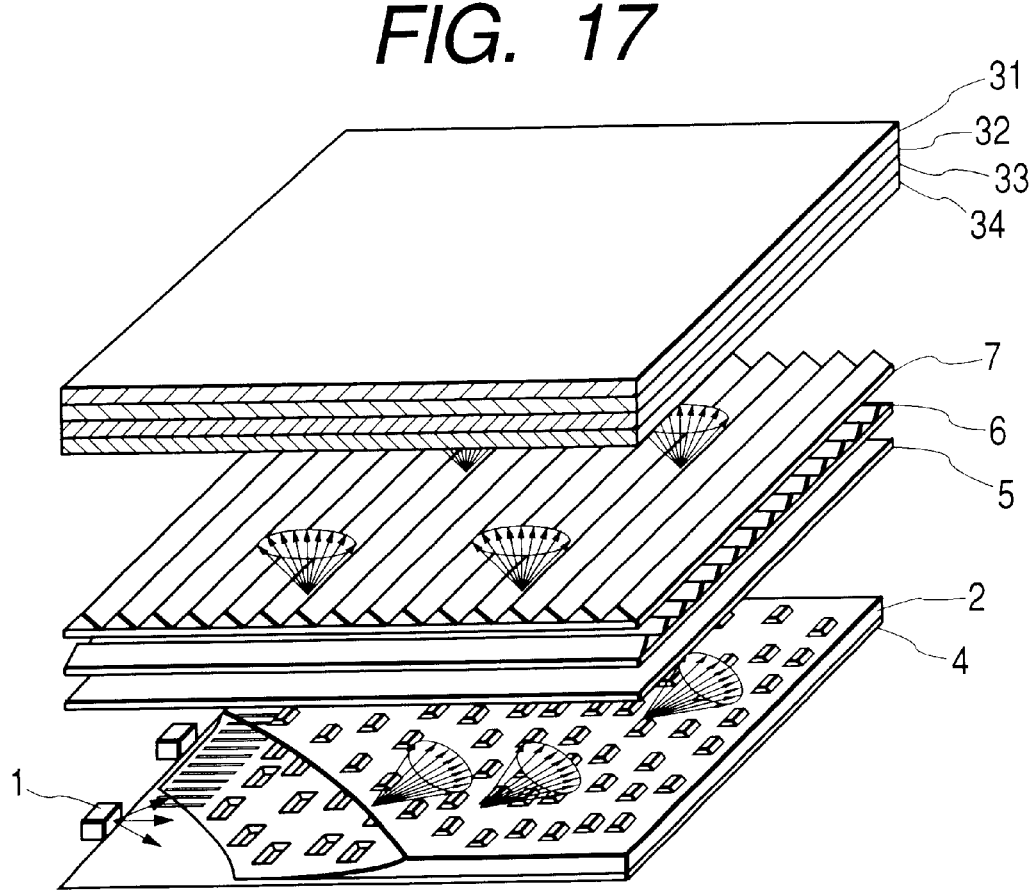
FIG. 17 is a perspective view showing the embodiment of the liquid crystal display device of the present invention.

FIG. 17 is a perspective view showing the embodiment of the liquid crystal display device of the present invention. A polarizing plate 31, liquid crystal element 32, color filter 33 and polarizing plate 34 are formed on the top surface of the backlit lighting device of the present invention shown in FIG. 1. This structure shows a common example of a liquid crystal display device, however a variety of structures containing a backlit device may be used according to the application. When a wide visual angle is required for example in television monitors or liquid crystal display devices for desk top personal computers, then a diffuser plate 5 for diffusing the irradiated light to widen the visual angle, may be installed at a suitable location.

Further, after installing a first and second prism sheet 6, 7 and beaming (irradiating) a highly directional light onto the liquid crystal element 32, a sheet having a diffuser effect can be installed to widen the visual angle, or the visual angle can be widened by processing the light emission surface to provide a light scattering (diffusion) effect.

A specific example of the light source 1 is described utilizing a LED.

There are no particular restrictions on the liquid crystal element 32 or liquid crystal cell, and an element and panel of the known art can be used. The general-purpose liquid crystal cell may be a twisted nematic type, a super-twist nematic type, a homogeneous type, a thin-film transistor type, an active-matrix type or a simple matrix drive type, etc.

A uniform brightness mask (not shown in drawing) can be utilized to compensate for irregularities in brightness occurring due to variations in the distance from the light source so that for example, a uniform brightness mask can be formed from a sheet to change the transmittance rate, and installed at an optional position on the light guide plate.

Figure 18:
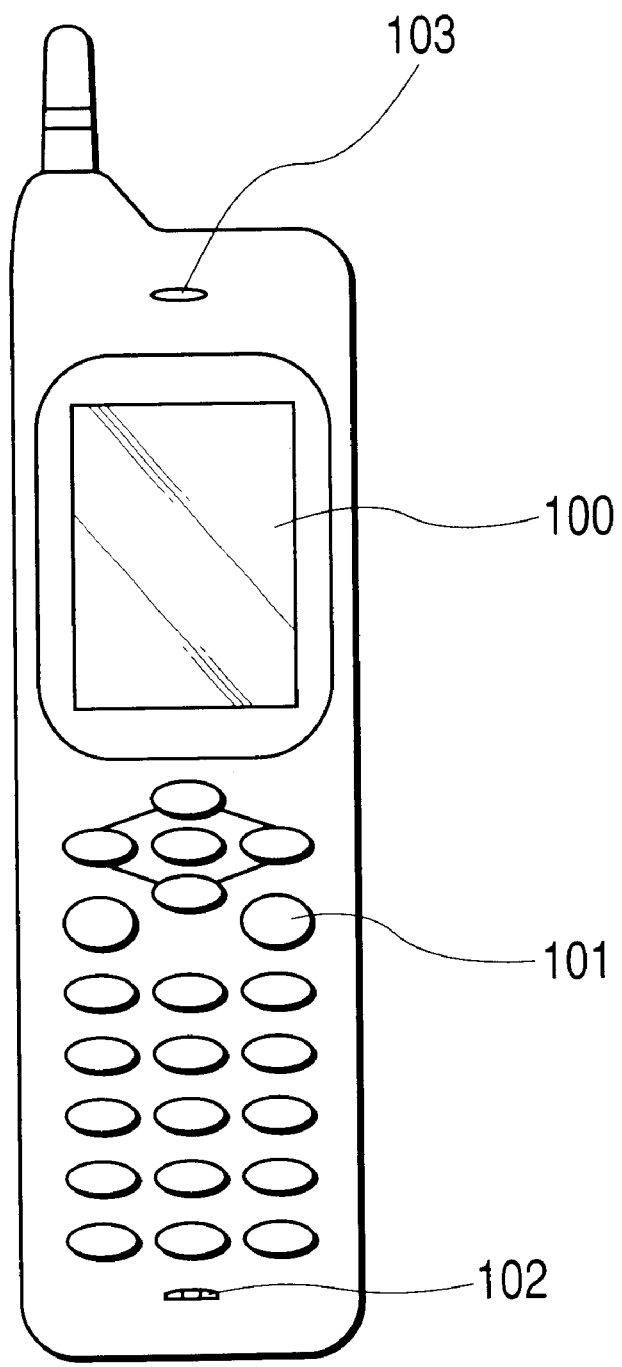
FIG. 18 is a flat view showing an embodiment of the cellular telephone using the liquid crystal display device of the present invention.

FIG. 18 is a perspective view of the fourth embodiment. The example of the present embodiment is a cellular telephone comprising a liquid crystal device 100 containing the backlit device of the present invention, an input device 101, a microphone 102, a speaker 103, an information processing device (not shown in drawing), a transmitter (not shown in drawing), and a receiver (not shown in drawing). Compared to the cellular telephone of the related art, the present embodiment provides an image display having uniform brightness over the entire display area.

Figure 19A:
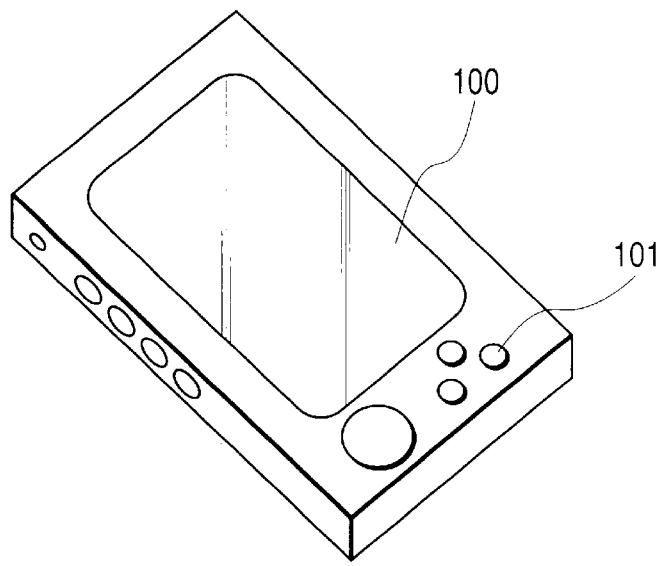
FIG. 19A is a perspective view and FIG. 19B is a flat view respectively showing an embodiment of the portable information processing device using the liquid crystal display device of the present invention.
Figure 19B:
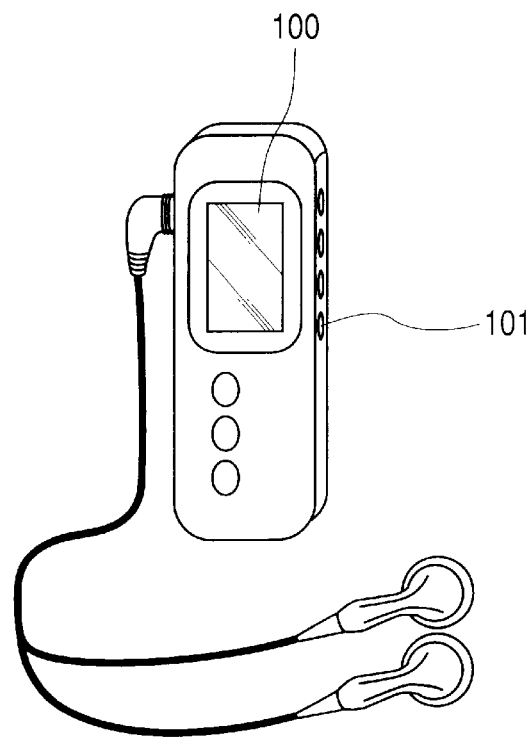

FIG. 19A and FIG. 19B are perspective views of the fifth embodiment. The present embodiment is a portable information processing device comprising a liquid crystal device 100 containing the backlit device of the present invention, an input device 101, and an information processing device (not shown in drawing). Compared to the information processing device of the related art, the present embodiment provides an image display having uniform brightness over the entire display area. The personal portable information terminal shown in FIG. 19A and the portable music player shown in FIG. 19B are presented as specific applications, however the invention is not limited to these examples. The present embodiment provides an image display having uniform brightness over the entire display area compared to the portable information terminal device of the related art.

Figure 20A:
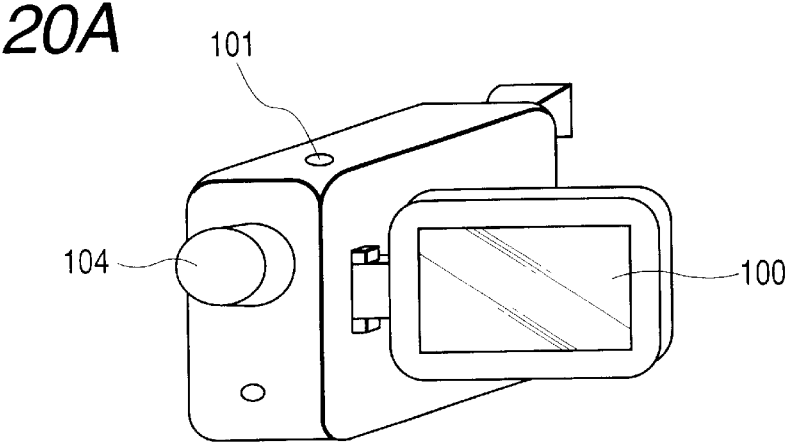
FIG. 20A and FIG. 20B are perspective views showing an embodiment of portable imaging devices using the liquid crystal display device of the present invention.
Figure 20B:
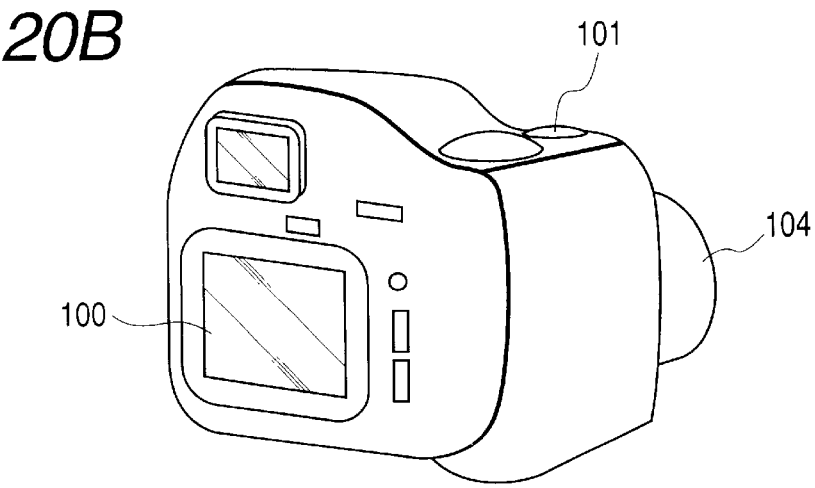

FIG. 20A and FIG. 20B are perspective views of the sixth embodiment. The present embodiment is a portable imaging device comprising a liquid crystal device 100 containing the backlit device of the present invention, an input device 101, an image input device 104, and an information processing device (not shown in drawing). Compared to the portable imaging device of the related art, the present embodiment provides an image display having uniform brightness over the entire display area.

The digital camera shown in FIG. 20A and the portable video recorder shown in FIG. 20B are presented as specific applications however the invention is not limited to these examples. The present embodiment provides an image display having uniform brightness over the entire display area compared to the portable information terminal device of the related art.

Figure 21:
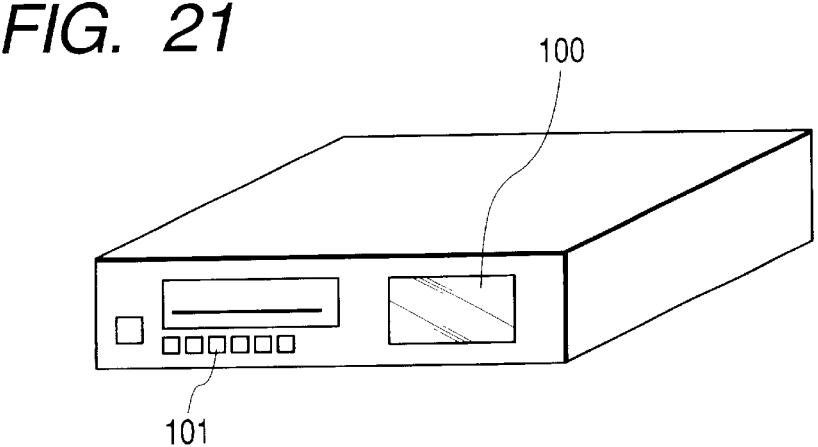
FIG. 21 is a perspective view showing an embodiment of an electrical apparatus using the liquid crystal display device of the present invention.

FIG. 21 is a perspective view of the seventh embodiment. The present embodiment is an electrical apparatus comprising a liquid crystal device 100 containing the backlit device of the present invention, an input device 101, and an information processing device (not shown in drawing). Compared to the electrical apparatus of the related art, the present embodiment provides an image display having uniform brightness over the entire display area. The power consumption is also low compared to the fluorescent display tube (VFD) often utilized in the electrical apparatus of the related art. The audiovisual equipment shown in FIG. 21 is presented as a specific example however the invention is not limited to this example.

The invention as described above therefore renders the effect that dark spots occurring due to point light are effectively prevented, uniform brightness can be obtained, and costs reduced.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A liquid crystal display device comprising:
   a backlit lighting device having a light guide plate, a light source installed on the side surface of said light guide plate and a light directional diffusing elements section of said light guide plate; and
   a liquid crystal element;
   wherein said light directional diffusing elements section is formed on at least one of an upper surface and a lower surface of said light guide plate near said light source and has a configuration of multiple light directional diffusing elements arranged in parallel to one another and substantially in parallel to an optical axis of light from said light source so as to make said light from said light source directional along a light guide plate surface and to diffuse said light from said light source along a flat surface of said light guide plate; and
   wherein light emitted from said backlit lighting device irradiates onto said liquid crystal element.

2. A liquid crystal display device for a liquid crystal element according to claim 1, wherein dots are formed on at least one of the upper surface and lower surface of said light guide plate other than an area of said light directional diffusing elements section near said light source to change the direction in which light is conveyed from said light source through said light directional diffusing elements section to a light emission surface direction.

3. A liquid crystal display device according to claim 1, wherein said light directional diffusing elements are hologram elements.

4. A liquid crystal display device according to claim 1, wherein said light directional diffusing elements are diffraction gratings.

5. A liquid crystal display device according to claim 1, wherein said light directional diffusing elements are cylindrical lens arrays.

6. A liquid crystal display device according to claim 1, wherein said light directional diffusing elements are microlens arrays.

7. A liquid crystal display device according to claim 3, wherein the element height of said hologram element is from 3 to 30 micrometers, and the element height divided by the element gap is 0.15 or more.

8. A liquid crystal display device according to claim 4, wherein the element height of said diffraction grating is from 3 to 30 micrometers, and the element height divided by the element gap is 0.15 or more.

9. A liquid crystal display device according to claim 5, wherein the lens height of said cylindrical lens array is from 3 to 30 micrometers, and the lens height divided by the grating gap is 0.15 or more, the lens cross sectional shape is a portion of an ellipse, and the length of the flat section of the lens is from 2 to 10 micrometers.

10. A liquid crystal display device according to claim 6, wherein the microlens flat surface shape is circular, elliptical, hexagonal, quadrangular or square with rounded edges, and that lens height is 3 to 30 micrometers, and the lens height divided by the gap is 0.15 or more.

11. A liquid crystal display device according to claim 2, wherein said dots are made from a plurality of small protrusions or small depressions, and the height of elements for said light directional diffusing elements is essentially the same height as for said dots.

12. A liquid crystal display device according to claim 3, wherein microdots made from a plurality of small protrusions or small depressions are formed on the upper surface and/or the lower surface on said light guide plate, to change the direction that light is emitted from the light source and said microdots are formed so that the microdot height (depth) is essentially the same as the height of said hologram element.

13. A liquid crystal display device according to claim 4, wherein microdots made from a plurality of small protrusions or small depressions are formed on the upper surface and/or the lower surface on said light guide plate to change the direction that light is emitted from the light source, and said microdots are formed so that the microdot height (depth) is essentially the same as the height of said diffraction grating.

14. A liquid crystal display device according to claim 5, wherein microdots made from a plurality of small protrusions or small depressions are formed on the upper surface and/or the lower surface on said light guide plate to change the direction that light is emitted from the light source, and said microdots are formed so that the microdot height (depth) is essentially the same as the lens height of said cylindrical lens array.

15. A liquid crystal display device according to claim 6, wherein microdots made from a plurality of small protrusions or small depressions are formed on the upper surface and/or the lower surface on said light guide plate to change the direction that light is emitted from the light source, and said microdots are formed so that the microdot height (depth) is essentially the same as the lens height of said microlens array.

16. A liquid crystal display device according to claims 11, wherein the flat shape of said dot may be elliptical or a square with rounded edges, with a length (long side) of 20 to 100 micrometers, and a value from 1 through 5 for long side divided by short side, and said dot cross sectional shape is a portion of an ellipse, and said dot height of 3 to 30 micrometers.

17. A backlit lighting device comprising:
   a light guide plate, a light source installed on the side surface of said light guide plate, and light directional diffusing elements section of said light guide plate;
   wherein said light directional diffusing elements section is formed on at least one of an upper surface and a lower surface of said light guide plate near said light source and has a configuration of multiple light directional diffusing elements arranged in parallel to one another and substantially in parallel to an optical axis of light from said light source so as to make said light from said light source directional along a light guide plate surface and to diffuse said light from said light source along a flat surface of said light guide plate.

18. A backlit lighting device according to claim 17, wherein except for the vicinity of said light source of said light guide plate, dots are formed on at least one of the upper surface and the lower surface on said light guide plate to change the direction that light is emitted from said light source.

19. A backlit lighting device according to claim 18, wherein said dots are made from a plurality of small protrusions or small depressions, and the height of the light directional diffusing elements is the same as the height of said dots.

20. A manufacturing method for liquid crystal display devices comprising:
   a step to form a light source on a side surface of a light guide plate;
   a step to form alight directional diffusing elements section of said light guide plate, wherein said light directional diffusing elements section is formed on at least one of an upper surface and a lower surface of said light guide plate near said light source and has a configuration of multiple light directional diffusing elements arranged in parallel to one another and substantially in parallel to an optical axis of light from said light source so as to make said light from said light source directional along a light guide plate surface and to diffuse said light from said light source along a flat surface of said light guide plate; and a step to irradiate the-light emitted from said light guide plate onto a liquid crystal display element of the liquid crystal display devices.

21. A manufacturing method for liquid crystal display devices according to claim 20, further comprising a step to form dots on the upper surface and the lower surface on said light guide plate, except for the vicinity of said light source of said light guide plate, to change the direction that light is emitted from said light source.

22. A manufacturing method for liquid crystal display devices according to claim 21, further comprising a step to form dots made from a plurality of small protrusions or small depressions, and make the height of said dots the same as the height of said light directional diffusing elements.

23. A cellular telephone with a backlit lighting device according to claims 1, comprising at least a liquid crystal display device with said backlit lighting device installed in the rear of said liquid crystal display element, an input device, an information processing device, a transmitter, and a receiver.

24. A portable information processing device with backlit lighting device according to claims 1, comprising at least a liquid crystal display device with said backlit lighting device installed in the rear of said liquid crystal display element, an input device, an information processing device.

25. A portable imaging device with backlit lighting device according to claims 1, comprising at least a liquid crystal display device with said backlit lighting device installed in the rear of said liquid crystal display element, an input device, a portable information processing device and an image input device.

26. An electrical apparatus with backlit lighting device according to claims 1, comprising at least a liquid crystal display device with said backlit lighting device installed in the rear of said liquid crystal display element, an input device, and an information processing device.

27. A liquid crystal display device for a liquid crystal element according to claim 1, wherein said light directional diffusing elements section is formed on an area of a distance less than 6 millimeters from said light source on at least one of the upper surface and the lower surface of said light guide plate so that there is no overlapping onto a liquid crystal element display section of said liquid crystal element.

28. A liquid crystal display device for a liquid crystal element according to claim 1, wherein said light directional diffusing elements section is formed on an area of a distance less than 6 millimeters from an edge of said light guide plate at the light source side, wherein said area does not overlap onto a liquid crystal element display section of said liquid crystal element.

29. A backlit lighting device according to claim 17, wherein said light directional diffusing elements section is formed on an area of a distance less than 6 millimeters from said light source on at least one of the upper surface and the lower surface of said light guide plate so that there is no overlapping onto a liquid crystal element display section of said liquid crystal element.

30. A new backlit lighting device according to claim 17, wherein said light directional diffusing elements section is formed on an area of a distance less than 6 millimeters from an edge of said light guide plate at the light source side, wherein said area does not overlap onto a liquid crystal element display section of said liquid crystal element.

* * * * *